(12) United States Patent
Lee

(10) Patent No.: US 6,824,380 B2
(45) Date of Patent: Nov. 30, 2004

(54) BALANCED-FLOW STRUCTURE FOR HOT RUNNER MANIFOLDS

(76) Inventor: Shu-Mei Lee, PO Box 82-144, Taipei (TW)

( * ) Notice: Subject to any disclaimer, the term of this patent is extended or adjusted under 35 U.S.C. 154(b) by 37 days.

(21) Appl. No.: 10/291,491

(22) Filed: Nov. 12, 2002

(65) Prior Publication Data

US 2004/0091568 A1 May 13, 2004

(51) Int. Cl.[7] .............................................. B29C 45/20
(52) U.S. Cl. .................................... 425/572; 264/328.8
(58) Field of Search .......................................... 425/572

(56) References Cited

U.S. PATENT DOCUMENTS 4,395,222 A * 7/1983 Gaiser et al. ............... 425/572

* cited by examiner

Primary Examiner—Tim Heitbrink
(74) Attorney, Agent, or Firm—Leong C. Lei

(57) ABSTRACT

An improved hot runner manifold for a multi-cavity injection molding system. The manifold is formed in a manifold block and an insert. This insert may be a round bar with an outward shape which is grooved with a flow channel, or the insert may be combined with a set of grooved round bars together with matched grooved pipes. This insert will be inserted into the bore of manifold block. This grooved insert works as a flow channel inside the manifold. Compared to the traditional manifold, this invention can easily help to produce a balanced-flow manifold which will shorten the delivery time, be produced inexpensively, provide an easier structure to make multiple-drops (such as 12, 16, 32, 64, 256 drops) in an elongated direction with a balanced flow, provide a manifold structure to help the flow channel of insert to be easily taken off for cleaning and provide a very good temperature-balance manifold in order to help molding nice quality plastic for each drop.

1 Claim, 3 Drawing Sheets

BALANCED-FLOW STRUCTURE FOR HOT RUNNER MANIFOLDS

BACKGROUND OF THE INVENTION

1. Field of the Invention

The present invention relates to a hot runner manifold for multi-cavity injection molding. The manifold is constructed in such a way that not only can it achieve a good balance-flow for each drop because of its simple structure, but it also has a low production cost. And it provides an easy method for maintenance when cleaning the manifold is required.

2. Description of the Prior Art

FIG. 1 is a simple chart which shows a runner system inside a unbalanced manifold. FIG. 1, it shows resins coming from the nozzle of an injection molding machine into the inlet of the manifold (12). The resins then pass through a runner passage flow (21). The manifold has four outlets ((13-A1), (13-A2), (13-A3), (13-A4)).

From the situation described above, there is a unbalance flow, because the pressure of resin inside the 13-A1 and 13-A3 isn't equal to the pressure of resin inside 13-A2 and 13-A4. This results in an unequal quality of product for each drop.

In order to have equal quality, manufactures try to produce manifolds which have a balanced flow structure. Like FIG. 2, after the inlet 12 and the runner passage 21, there is a sprue runner 23 and the runner passage 22. There are also the outlets 13-B1, 13-B2, 13-B3, 13-B4. From the flow chart, it can be seen that there will be the same pressure of resin action within the 4 outlets. For the outlets having more than 8 drops, such as 12 drops, FIG. 5 shows this in a simple balance flow chart. In real use, the traditional manifold is made like FIG. 6. There are a lot of plugs which have to be done to change the direction of the runner passage in order to achieve balance flow. This method makes a multi-drops manifold in elongated directions. Not only does it become very complicated when it is machined, but it is also very difficult to be achieved, because too many plugs need to be completed.

Also when the runner passages inside the manifold have to be cleaned, it is very difficult to complete this work. Hence, the inventor has found it necessary to invent a good structure which not only has a simple way to make a manifold but also can have easily maintained.

U.S. Pat. No. 5,762,976 to Paul shows a manifold for thermally sensitive resins that appears to be well-balanced and have corners in multi-drops manifold. But it is very complicated to manufacture. Also it is very difficult for the multi-drops to have more than 8 outlets in an elongated direction. For example, U.S. Pat. No. 4,761,343 to Gellert, focuses on a balance flow manifold system with bridging manifold which extends transversely across a number of spaced elongated support manifolds. It does not mention how to produce an easy way to make a multi-drops manifold for an elongated direction. The U.S. Pat. No. 6,007,108 to Ewikon, shows the distribution plugs for use with a nozzle manifold of a hot runner injection molding system. It is totally different from the present invention, because the present invention is a manifold without any plugs, U.S. Pat. No. 5,804,231 to Philip shows a manifold for a hot process injection molding apparatus which includes a two piece manifold for a slidable coupling in case of my expansion and contraction. The present invention differs markedly from the patent. U.S. Pat. No. 4,964,795 to Patrick which shows a manifold assembly used for conveying plastic injection molding material from a central injection point or sprue to multi-cavity. It focuses on inhibiting the heat transfer between the manifold and the core or cavity. U.S. Pat. No. 4,299,553 to Nareshwar shows a manifold formed in two pairs which includesa plate and a ring which are joined along a central parting line in a manner wherein all of the sprue and runner portions may be readily and accurately machined. It is for drops in circle location. However, the present invention is for drops in an elongated location.

DETAILED DESCRIPTION OF THE PREFERRED EMBODIMENT

Figure 1:
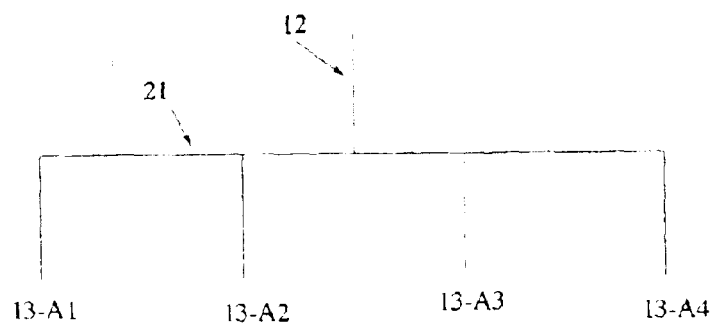
FIG. 1 shows a simple chart of unbalanced flow runner passage for a four-drops runner system.
Figure 2:
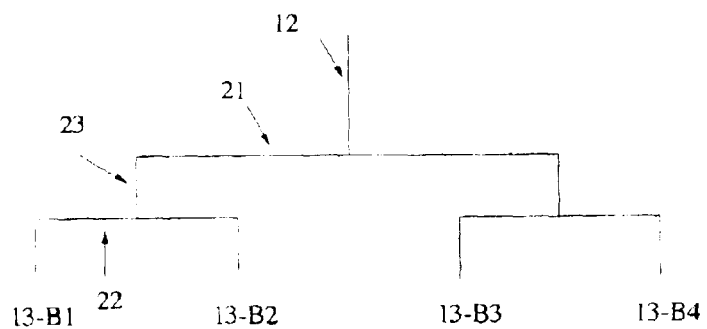
FIG. 2 shows a simple chart of balanced flow runner passage for a four-drops runner system.
Figure 3:
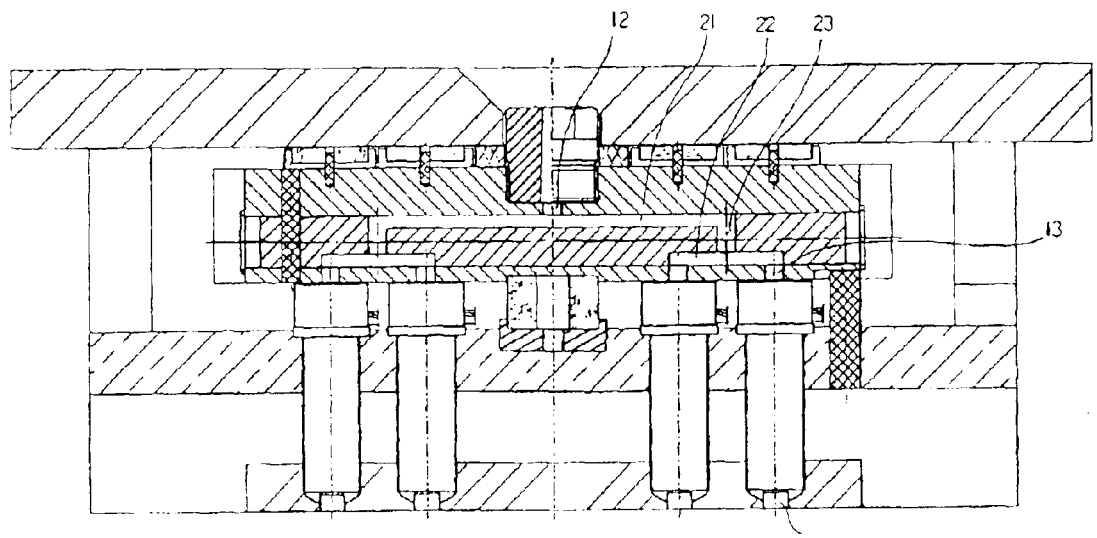
FIG. 3 shows a partial sectional view showing the fixed half mold of an injection molding system including a manifold system.
Figure 4:
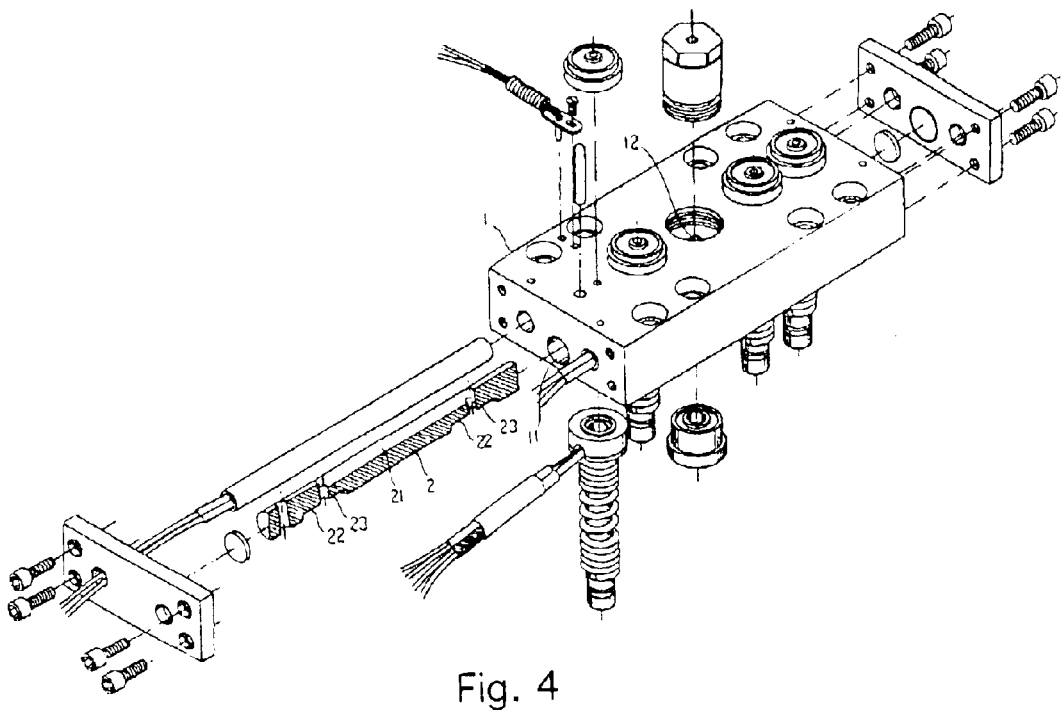
FIG. 4 shows an isometric view of a four-drop manifold system in an elongated direction.

FIG. 3 and FIG. 4 shows a structure of a 4 cavity as an example of anembodiment of the invention. However, a typical production of a hot runner system has eight, sixteen, twenty-four, forty-eight, seventy-two, or ninety-six cavities. The invention is equally applicable to all multi-cavity manifolds. Referring to FIGS. 5, 6, 7, 8, the manifold is used for a twelve drops situation. It provides a different structure between the traditional manifold and the invented manifold.

From FIG. 3 and FIG. 4, the structure of this invented manifold system can be understood. The runner bar (2) will be inserted into the bore (11) inside of the manifold block (1). The runner bar (2) is grooved with the axial runner (21), the other axial runner (22) which is located opposite to the axial runner 21, and radial runners (23). After the insert bar (2) is inserted to the bore (11) of the manifold, axial runners (21) and (22) and radial runners (23) will form a balanced flow runner system because each drop has equal flow distance.

Figure 5:
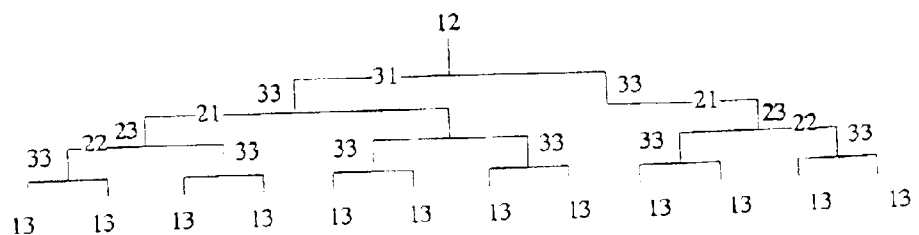
FIG. 5 shows a simple chart of balanced flow runner passage for a twelve-drops runner system.
Figure 6:
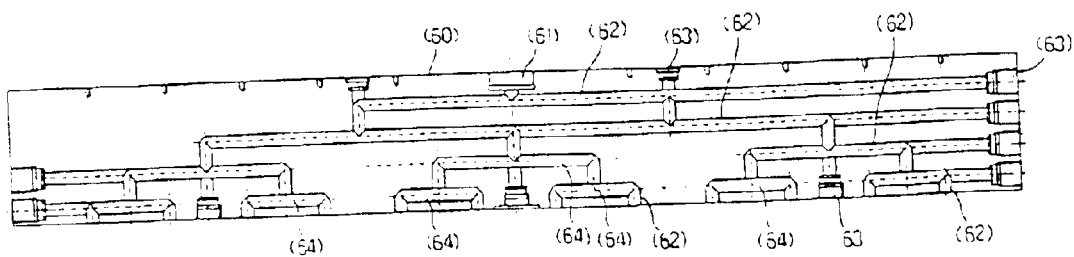
FIG. 6 shows a partial sectional view showing a traditional manifold which is machined to be plugged.

FIG. 5 is a simple drawing of a balanced flow chart of 12 drops. FIG. 6 shows a traditional 12 drops manifold (60). Within the manifold (60), the runners are made by drilling a bore (62) which goes through the elongated side. After that, the corners of the runners are made by some kinds of plugs (63). Therefore the more drops are elongated, the more difficult it becomes to make the runners. For the manifold which needs outlets of more than 8 drops in an elongated direction, it becomes complicated. From this situation, if there is a manifold of 32 or 64 drops in an elongated direction, it will become impossible.

Figure 7:
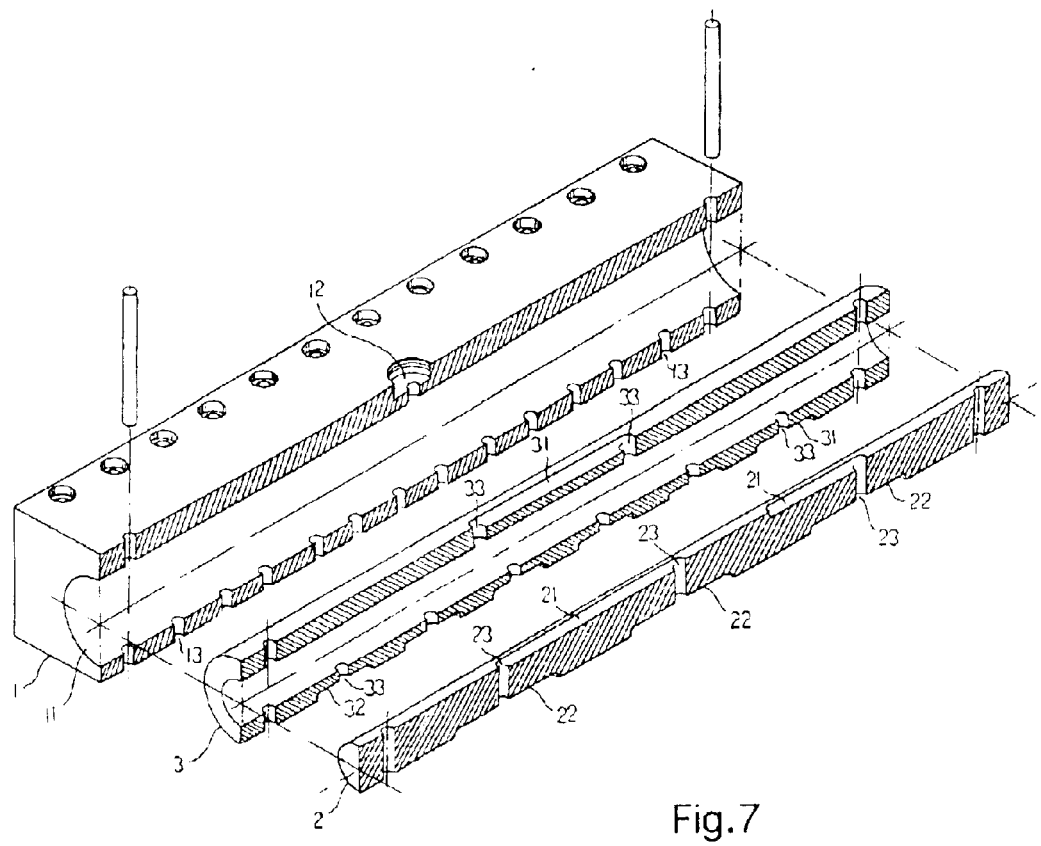
FIG. 7 shows an isometric view as well as a sectional view for the manifold system.
Figure 8:
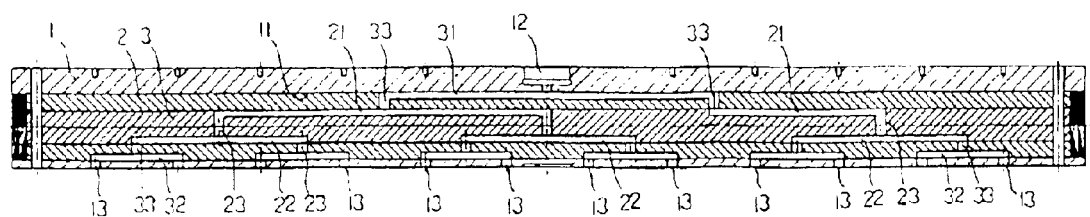
FIG. 8 shows a partial sectional view for the present invention manifold which assembly without any plug.

FIG. 7 and FIG. 8 illustrate a new 12 drops invented manifold system. There is a grooved pipe (3) fitted into the manifold (1) and grooved bar (2) is fitted into the grooved pipe (3). After this assembly, there is a balanced flow with 12 drops runner system which can be completed easily. In FIG. 7, axial runners (21)(22) and radial runner (23) are made on grooved bar (2), axial runner (31)(32) and radial runner (33) are made on grooved bar (3). All of the runners are positioned at an equilateral distance to provide balanced flow drops (13). Hence, it is easy to get 4 drops in an elongated direction for one grooved bar. For 16 drops, it only needs one groove bar with one matched grooved pipe. For 64 drops, it only needs one grooved bar with two matched grooved pipes. For 256 drops, it only needs one grooved bar the three matched grooved pipes. Thus, the application has an unlimited drop capacity in a balanced flow manifold. The present invention is a no-plug runner system. Therefore, the present invention can produce a manifold more easily with the advantages as following: Quick delivery of the manifold because the process of manufacture become easier, the cost of the manifold is inexpensive manifold, the possibility of more drops in an elongated direction. From a maintenance point of view, not only can the inserts of runner system be easily taken off for cleaning when it is necessary, but it is also possible to get a good temperature balance manifold when inserts (2)(3) are made with a good heat-conductive material (such as BeCu copper, or TZM special harden alloy).

While the present invention has been illustrated and explained hereinabove, it is intended to be taken by way of example and out of limitation, it is anticipated that certain alternatives will be apparent to one having ordinary skill in the art and therefore such alternatives are intend to be encompassed by the claims as appended hereto.

I claim:

1. A balanced flow of hot runner manifold for injection molding of plastic comprising:

a manifold block having a bore;

a grooved pipe fitted into said bore and formed with axial runners and radial runners; and a runner bar inserted into said grooved pipe, said runner bar being grooved with a first axial runner, second axial runner located opposite to said first axial runner, and radial runners.

* * * * *